(12) United States Patent
Chen

(10) Patent No.: US 10,104,284 B2
(45) Date of Patent: Oct. 16, 2018

(54) METHOD AND APPARATUS FOR DETERMINING PHOTOGRAPHING DELAY TIME, AND PHOTOGRAPHING DEVICE

(71) Applicant: Huawei Technologies Co., Ltd., Shenzhen (CN)

(72) Inventor: Xi Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/512,492

(22) PCT Filed: Sep. 19, 2014

(86) PCT No.: PCT/CN2014/086905
§ 371 (c)(1),
(2) Date: Mar. 17, 2017

(87) PCT Pub. No.: WO2016/041188
PCT Pub. Date: Mar. 24, 2016

(65) Prior Publication Data
US 2017/0280049 A1      Sep. 28, 2017

(51) Int. Cl.
*H04N 5/232* (2006.01)
*H04N 1/21* (2006.01)

(52) U.S. Cl.
CPC ....... *H04N 5/23222* (2013.01); *H04N 1/2133* (2013.01); *H04N 5/23293* (2013.01); *H04N 2201/0084* (2013.01)

(58) Field of Classification Search
CPC ........... H04N 5/23222; H04N 5/23293; H04N 1/2133; H04N 2201/0084
See application file for complete search history.

(56) References Cited

U.S. PATENT DOCUMENTS

2003/0189647 A1* 10/2003 Kang .................... H04N 5/232
348/207.99
2005/0220450 A1    10/2005 Enomoto et al.
(Continued)

FOREIGN PATENT DOCUMENTS

CN          101690163 A      3/2010
CN          102411844 A      4/2012
(Continued)

OTHER PUBLICATIONS

CN 201480045996.6, Office Action, dated Feb. 26, 2018.

*Primary Examiner* — Jason A Flohre
(74) *Attorney, Agent, or Firm* — Leydig, Voit & Mayer, Ltd.

(57) ABSTRACT

A method and an apparatus for determining a photographing delay time and a photographing device are disclosed. The method includes: controlling the photographing device to form, according to a preset imaging cycle, an image of a photographed object, and storing an imaged photo; each time photographing is initiated, displaying the imaged photo and receiving a first operation instruction entered by a user; determining, according to the first operation instruction, a corresponding target imaged photo; calculating a difference between an initiation moment of each time of photographing and an imaging moment of the corresponding target imaged photo, to obtain a delay time corresponding to a single time of photographing; and calculating an average value of delay times corresponding to at least two times of photographing, where the average value may be used as a standard delay time caused by an operation of the user on the photographing device.

15 Claims, 7 Drawing Sheets

(56) References Cited

U.S. PATENT DOCUMENTS

| | | |
|---|---|---|
| 2006/0098106 A1 | 5/2006 | Tanaka |
| 2008/0136942 A1* | 6/2008 | Yoon ................... H04N 5/23293 348/231.99 |
| 2008/0198243 A1* | 8/2008 | Kijima ............... H04N 5/23293 348/231.99 |
| 2008/0278607 A1* | 11/2008 | Zhang .................... G06T 5/002 348/241 |
| 2008/0309778 A1 | 12/2008 | Tabatabai et al. |
| 2009/0303367 A1 | 12/2009 | Sakaguchi |
| 2011/0050722 A1* | 3/2011 | Muraki .............. H04N 5/23293 345/620 |
| 2012/0141007 A1 | 6/2012 | Takizawa et al. |
| 2013/0293746 A1* | 11/2013 | Iki ...................... H04N 5/23293 348/239 |
| 2015/0139495 A1* | 5/2015 | Sohn ...................... H04N 5/265 382/103 |

FOREIGN PATENT DOCUMENTS

| | | |
|---|---|---|
| CN | 102469953 A | 5/2012 |
| CN | 103248856 A | 8/2013 |
| CN | 103297695 A | 9/2013 |
| CN | 103336405 A | 10/2013 |
| CN | 103458191 A | 12/2013 |
| CN | 103607533 A | 2/2014 |

\* cited by examiner

METHOD AND APPARATUS FOR DETERMINING PHOTOGRAPHING DELAY TIME, AND PHOTOGRAPHING DEVICE

CROSS-REFERENCE TO RELATED APPLICATIONS

This application is a national stage of International Application No. PCT/CN2014/086905, filed on Sep. 19, 2014, which is hereby incorporated by reference in its entirety.

TECHNICAL FIELD

The present invention relates to the field of camera control technologies, and in particular, to a method and an apparatus for determining a photographing delay time and a photographing device.

BACKGROUND

With improvement of living standards, cameras and devices such as a mobile phone and a tablet computer that have a photographing function become popular. Photographing a photo using these devices requires a process of determining a picture and initiating photographing. It can be learned from the process that, compared with a moment corresponding to a picture that the user really wants to photograph, a moment corresponding to a photo actually photographed by a photographing device generally has a certain delay. Existence of the delay time greatly affects a photographing effect of the photographing device. In particular, for a dynamic object whose status or shift changes relatively fast, when the photographing device initiates photographing, the picture determined by the user already disappears, and consequently, it is difficult to photograph a photo that the user really wants.

Therefore, a delay time generated by the photographing device needs to be determined, so that the photographing device can automatically obtain, according to the determined delay time, a photo that satisfies the user, so as to improve photographing quality.

SUMMARY

Embodiments of the present application provide a method and an apparatus for determining a photographing delay time and a photographing device, so that the photographing device can automatically obtain, according to a determined delay time, a photo that satisfies a user, so as to improve photographing quality.

To resolve the foregoing technical problem, the embodiments of the present application disclose the following technical solutions:

A first aspect of the present application provides a method for determining a photographing delay time, where the method is applied in a photographing device and includes:

controlling the photographing device to form, according to a preset imaging cycle, an image of a photographed object, and storing an imaged photo and a corresponding imaging moment;

after the photographing device initiates photographing, displaying the imaged photo and receiving a first operation instruction entered by a user;

determining, according to the first operation instruction, a target imaged photo of this time of photographing;

calculating a difference between an initiation moment of this time of photographing and an imaging moment corresponding to the target imaged photo, to obtain a delay time corresponding to this time of photographing; and obtaining an average value of at least two delay times to generate a standard delay time caused by an operation of the user on the photographing device.

With reference to the first aspect, in a first possible implementation manner of the first aspect, the obtaining an average value of at least two delay times to generate a standard delay time caused by an operation of the user on the photographing device includes:

obtaining N delay times corresponding to the first time of photographing to the $N^{th}$ time of photographing performed by the user, and calculating an average value of the N delay times to obtain an average delay time corresponding to the $N^{th}$ time of photographing, where N is an integer greater than 1; and when a difference between the average delay time corresponding to the $N^{th}$ time of photographing and an average delay time corresponding to the $(N-1)^{th}$ time of photographing is within a preset range, updating, to the average delay time corresponding to the $N^{th}$ time of photographing, the standard delay time caused by the operation of the user on the photographing device.

With reference to the first aspect, in a second possible implementation manner of the first aspect, the obtaining an average value of at least two delay times to generate a standard delay time caused by an operation of the user on the photographing device includes:

obtaining N delay times corresponding to the first time of photographing to the $N^{th}$ time of photographing performed by the user, and calculating an average value of the N delay times to obtain an average delay time corresponding to the $N^{th}$ time of photographing, where N is an integer greater than 1;

calculating a difference moment between an initiation moment corresponding to the $(N+1)^{th}$ time of photographing and the average delay time corresponding to the $N^{th}$ time of photographing; and if an imaged photo corresponding to the difference moment is a target imaged photo of the $(N+1)^{th}$ time of photographing, updating, to the average delay time corresponding to the $N^{th}$ time of photographing, the standard delay time caused by the operation of the user on the photographing device.

With reference to the first aspect, in a third possible implementation manner of the first aspect, the obtaining an average value of at least two delay times to generate a standard delay time caused by an operation of the user on the photographing device includes:

obtaining a delay time of a preset quantity of times of photographing, and calculating an average value of the delay time of the preset quantity of times of photographing, to obtain the standard delay time caused by the operation of the user on the photographing device.

With reference to the first aspect, the first possible implementation manner of the first aspect, the second possible implementation manner of the first aspect, or the third possible implementation manner of the first aspect, in a fourth possible implementation manner of the first aspect, the displaying the imaged photo includes:

determining, according to the initiation moment of this time of photographing and a preset time interval, a photo display time period corresponding to this time of photographing; and displaying an imaged photo whose imaging moment is within the photo display time period.

With reference to the first aspect, the first possible implementation manner of the first aspect, the second possible implementation manner of the first aspect, or the third possible implementation manner of the first aspect, in a fifth possible implementation manner of the first aspect, the displaying the imaged photo includes:

displaying multiple imaged photos by overlapping them according to different transparencies.

A second aspect of the present application provides an apparatus for determining a photographing delay time, where the apparatus is applied in a photographing device and includes:

a cyclic imaging control unit, configured to control the photographing device to form, according to a preset imaging cycle, an image of a photographed object;

an imaged photo buffering unit, configured to store an imaged photo and a corresponding imaging moment;

a display control unit, configured to: after the photographing device initiates photographing, display the imaged photo;

an instruction receiving unit, configured to receive a first operation instruction entered by a user;

a target photo determining unit, configured to determine, according to the first operation instruction, a target imaged photo of this time of photographing;

a delay time calculation unit, configured to calculate a difference between an initiation moment of this time of photographing and an imaging moment corresponding to the target imaged photo, to obtain a delay time corresponding to this time of photographing; and a standard delay determining unit, configured to obtain an average value of at least two delay times to generate a standard delay time caused by an operation of the user on the photographing device.

With reference to the second aspect, in a first possible implementation manner of the second aspect, the standard delay determining unit includes:

a first averaging subunit, configured to obtain N delay times corresponding to the first time of photographing to the $N^{th}$ time of photographing performed by the user, and calculate an average value of the N delay times to obtain an average delay time corresponding to the $N^{th}$ time of photographing, where N is an integer greater than 1; and a first update subunit, configured to: when a difference between the average delay time corresponding to the $N^{th}$ time of photographing and an average delay time corresponding to the $(N-1)^{th}$ time of photographing is within a preset range, update, to the average delay time corresponding to the $N^{th}$ time of photographing, the standard delay time caused by the operation of the user on the photographing device.

With reference to the second aspect, in a second possible implementation manner of the second aspect, the standard delay determining unit includes:

a second averaging subunit, configured to obtain N delay times corresponding to the first time of photographing to the $N^{th}$ time of photographing performed by the user, and calculate an average value of the N delay times to obtain an average delay time corresponding to the $N^{th}$ time of photographing, where N is an integer greater than 1;

a difference moment calculation subunit, configured to calculate a difference moment between an initiation moment corresponding to the $(N+1)^{th}$ time of photographing and the average delay time corresponding to the $N^{th}$ time of photographing; and a second update subunit, configured to: if an imaged photo corresponding to the difference moment is a target imaged photo of the $(N+1)^{th}$ time of photographing, update, to the average delay time corresponding to the $N^{th}$ time of photographing, the standard delay time caused by the operation of the user on the photographing device.

With reference to the second aspect, in a third possible implementation manner of the second aspect, the standard delay determining unit includes:

a third averaging subunit, configured to obtain a delay time of a preset quantity of times of photographing, and calculate an average value of the delay time of the preset quantity of times of photographing, to obtain the standard delay time caused by the operation of the user on the photographing device.

With reference to the second aspect, the first possible implementation manner of the second aspect, the second possible implementation manner of the second aspect, or the third possible implementation manner of the second aspect, in a fourth possible implementation manner of the second aspect, the display control unit includes:

a display time period determining subunit, configured to determine, according to the initiation moment of this time of photographing and a preset time interval, a photo display time period corresponding to this time of photographing; and a display control subunit, configured to display an imaged photo whose imaging moment is within the photo display time period.

With reference to the second aspect, the first possible implementation manner of the second aspect, the second possible implementation manner of the second aspect, or the third possible implementation manner of the second aspect, in a fifth possible implementation manner of the second aspect, the display control unit includes:

an overlapping display control subunit, configured to display multiple imaged photos by overlapping them according to different transparencies.

A third aspect of the present application provides a photographing device, including:

a processor; and a memory, configured to store an instruction that can be executed by the processor, where the processor is configured to:

control the photographing device to form, according to a preset imaging cycle, an image of a photographed object, and store an imaged photo and a corresponding imaging moment;

after the photographing device initiates photographing, display the imaged photo and receive a first operation instruction entered by a user;

determine, according to the first operation instruction, a target imaged photo of this time of photographing;

calculate a difference between an initiation moment of this time of photographing and an imaging moment corresponding to the target imaged photo, to obtain a delay time corresponding to this time of photographing; and obtain an average value of at least two delay times to generate a standard delay time caused by an operation of the user on the photographing device.

With reference to the third aspect, in a first possible implementation manner of the third aspect, the processor is configured to perform, by using the following method, the step of obtaining an average value of at least two delay times to generate a standard delay time caused by an operation of the user on the photographing device:

obtaining N delay times corresponding to the first time of photographing to the $N^{th}$ time of photographing performed by the user, and calculating an average value of the N delay times to obtain an average delay time corresponding to the $N^{th}$ time of photographing, where N is an integer greater than 1; and when a difference between the average delay time corresponding to the $N^{th}$ time of photographing and an average delay time corresponding to the $(N-1)^{th}$ time of photographing is within a preset range, updating, to the average delay time corresponding to the $N^{th}$ time of photographing, the standard delay time caused by the operation of the user on the photographing device.

With reference to the third aspect, in a second possible implementation manner of the third aspect, the processor is configured to perform, by using the following method, the step of obtaining an average value of at least two delay times to generate a standard delay time caused by an operation of the user on the photographing device:

obtaining N delay times corresponding to the first time of photographing to the $N^{th}$ time of photographing performed by the user, and calculating an average value of the N delay times to obtain an average delay time corresponding to the $N^{th}$ time of photographing, where N is an integer greater than 1;

calculating a difference moment between an initiation moment corresponding to the $(N+1)^{th}$ time of photographing and the average delay time corresponding to the $N^{th}$ time of photographing; and if an imaged photo corresponding to the difference moment is a target imaged photo of the $(N+1)^{th}$ time of photographing, updating, to the average delay time corresponding to the $N^{th}$ time of photographing, the standard delay time caused by the operation of the user on the photographing device.

With reference to the third aspect, in a third possible implementation manner of the third aspect, the processor is configured to perform, by using the following method, the step of obtaining an average value of at least two delay times to generate a standard delay time caused by an operation of the user on the photographing device:

obtaining a delay time of a preset quantity of times of photographing, and calculating an average value of the delay time of the preset quantity of times of photographing, to obtain the standard delay time caused by the operation of the user on the photographing device.

With reference to the third aspect, the first possible implementation manner of the third aspect, the second possible implementation manner of the third aspect, or the third possible implementation manner of the third aspect, in a fourth possible implementation manner of the third aspect, the processor is configured to perform, by using the following method, the step of displaying the imaged photo:

determining, according to the initiation moment of this time of photographing and a preset time interval, a photo display time period corresponding to this time of photographing; and displaying an imaged photo whose imaging moment is within the photo display time period.

With reference to the third aspect, the first possible implementation manner of the third aspect, the second possible implementation manner of the third aspect, or the third possible implementation manner of the third aspect, in a fifth possible implementation manner of the third aspect, the processor is configured to perform, by using the following method, the step of displaying the imaged photo:

displaying multiple imaged photos by overlapping them according to different transparencies.

It can be learned from the foregoing technical solutions that, according to the embodiments of the present application, a photographing device is controlled to form, according to a preset imaging cycle, an image of a photographed object and store an imaged photo; each time photographing is initiated, an imaged photo is displayed and a first operation instruction sent by a user based on the displayed imaged photo is received; a corresponding target imaged photo is determined according to the first operation instruction; and then a difference between a photographing initiation moment and an imaging moment corresponding to the target imaged photo is calculated to obtain a delay time of one time of photographing; an average value of delay times of multiple times of photographing is calculated to obtain an average delay time, where the average delay time may be used as a standard delay time caused by an operation of the user on the photographing device. Therefore, to determine a standard delay time caused by an operation of a specific user on a photographing device, only the foregoing operations need to be performed in a process in which the specific user performs photographing by using this photographing device, so that the corresponding standard delay time can be obtained. Compared with using a delay time of a single time of photographing, using the average delay time can reduce an accidental error. When the average delay time is used as a standard delay time and applied in a photographing process, an obtained photo may be closer to a photo that the user wants to photograph, so that a photographing effect is improved.

BRIEF DESCRIPTION OF DRAWINGS

To describe the technical solutions in the embodiments of the present application more clearly, the following briefly introduces the accompanying drawings required for describing the embodiments. Apparently, a person of ordinary skill in the art may still derive other drawings from these accompanying drawings without creative efforts.

DESCRIPTION OF EMBODIMENTS

To implement the objectives of the present application, the present application provides a method and an apparatus for determining a photographing delay time and a photographing device.

To make a person skilled in the art understand the solutions in the present application better, the following clearly describes the technical solutions in the embodiments of the present application with reference to the accompanying drawings in the embodiments of the present application.

In a research process, the applicant has found that a photographing delay of the photographing device may be caused by a user, that is, a reaction time $\Delta t1$ between two actions of the user, from seeing a desired scene to pressing a shutter; or may be caused by the photographing device, that is, a time interval $\Delta t2$ between two actions of the photographing device, from initiating the shutter (the shutter is pressed) to obtaining an imaged photo. In addition, for a digital photographing device that uses a liquid crystal display for framing and preview, because displaying a preview picture by using the liquid crystal display requires that the photographing device perform a series of processing operations such as image shooting, operation, imaging, and liquid crystal displaying, a picture seen by the user on the liquid crystal display is not a picture of a current moment, but is a picture of a moment before the current moment, where a time difference $\Delta t3$ between the two moments is an execution time required for the foregoing processing operation and is one of main causes of a photographing delay of the foregoing digital photographing device. In view of the foregoing causes, if a user determines, by using a liquid crystal display, to photograph a picture of a moment t, when a shutter is pressed, a photo of a moment $t+\Delta t3+\Delta t1+\Delta t2$ is taken by the photographing device, that is, a delay time is $\Delta t3+\Delta t1+\Delta t2$ ($\Delta t1$, $\Delta t2$, and $\Delta t3$ are all greater than 0).

Different users have different reaction times $\Delta t1$, and time differences $\Delta t2$ and $\Delta t3$ that are corresponding to different photographing devices are also different. Consequently, delay times generated are all different when different users operate a same photographing device and a same user operates different photographing devices, and a standard delay time applicable to all the users and all the photographing devices cannot be determined. Therefore, the embodiments of the present application provide the following technical solutions to determine a standard delay time generated when a specific user operates a specific photographing device, so that a photo satisfying the specific user is automatically obtained according to the standard delay time when photographing is performed.

Figure 1:
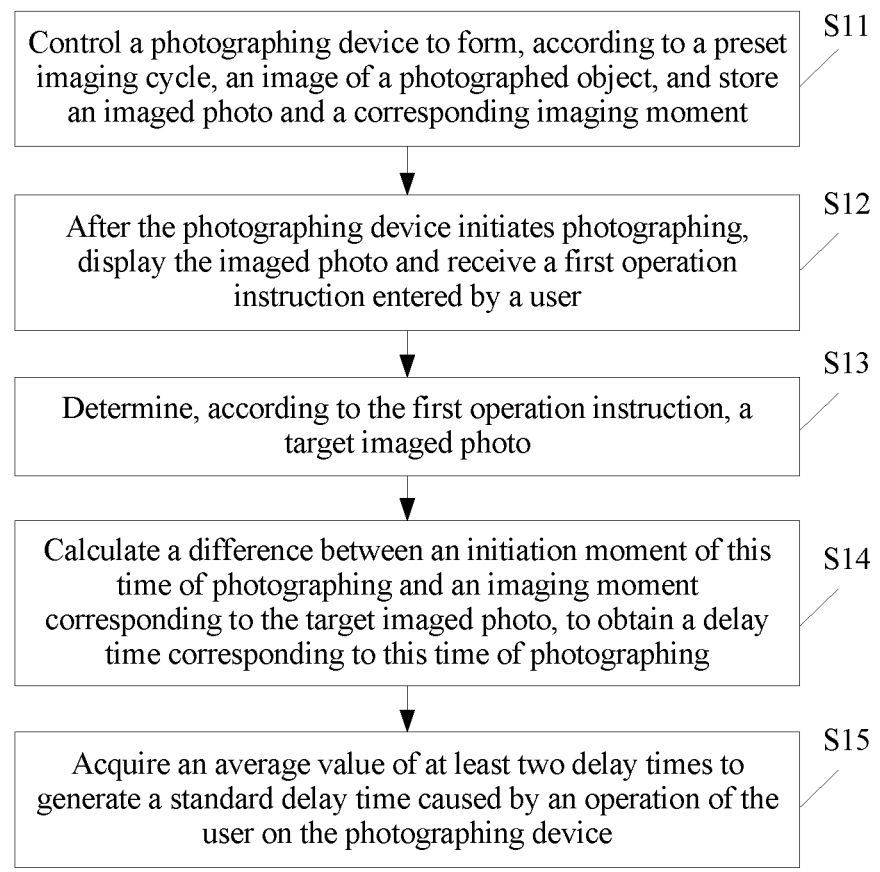
FIG. 1 is a flowchart of a method for determining a photographing delay time according to an embodiment of the present application.

FIG. 1 is a flowchart of a method for determining a photographing delay time according to Embodiment 1 of the present application. Referring to FIG. 1, the method for determining a photographing delay time is applied in a photographing device and includes the following steps:

S11. Control the photographing device to form, according to a preset imaging cycle, an image of a photographed object, and store an imaged photo and a corresponding imaging moment.

It is assumed that the preset imaging cycle is T. The photographing device performs imaging processing at a time interval of T, and stores the obtained imaged photo and the corresponding imaging moment.

The foregoing imaging processing process includes the following steps: Light reflected by the photographed object and a surrounding object passes through a lens of the photographing device and concentrates on a photosensitive element of the photographing device; the photosensitive element converts a received optical signal into a corresponding electrical signal; an image processor of the photographing device processes the electrical signal that is obtained by means of conversion by the image processor, as a real image, that is, the imaged photo.

The imaged photo may be stored in a buffer of the photographing device. After the photographing device is powered off, the imaged photo stored in the buffer is automatically deleted. After the photographing device is powered on again, a new imaged photo can be stored in the buffer.

S12. After the photographing device initiates photographing, display the imaged photo and receive a first operation instruction entered by a user.

S13. Determine, according to the first operation instruction, a target imaged photo.

When the user sees a picture that the user wants to photograph, the user presses the shutter of the photographing device to enable the photographing device to initiate photographing. After this time of photographing is complete, an imaged photo stored in the foregoing buffer is displayed. After selecting a satisfactory imaged photo from the displayed imaged photo, the user performs a corresponding confirm operation (for example, double-tapping the selected imaged photo on a touchscreen, or pressing a corresponding physical button) to generate the first operation instruction. The photographing device can determine, according to the first operation instruction, which imaged photo in the buffer is the imaged photo selected by the user, that is, the target imaged photo of this time of photographing. Compared with storing the imaged photo obtained by performing cyclic imaging processing in the buffer as described above, in this embodiment of the present application, the determined target imaged photo is stored in a nonvolatile memory, so that the target imaged photo is permanently saved and is prevented from being deleted after the photographing device is powered off. The foregoing nonvolatile memory may be a memory card installed on the photographing device, for example, a secure digital memory card (Secure Digital Memory Card, SD Card) or a portable flash card (Compact Flash, CF), or may be a read-only memory (Read Only Memory, ROM) of the photographing device.

S14. Calculate a difference between an initiation moment of this time of photographing and an imaging moment corresponding to the target imaged photo, to obtain a delay time corresponding to this time of photographing.

In this embodiment of the present application, that the photographing device initiates photographing is that the user presses the shutter of the photographing device; correspondingly, the initiation moment of this time of photographing is a moment when the user presses the shutter at this time.

It is assumed that the initiation moment of this time of photographing is t1 and the imaging moment corresponding to the target imaged photo is t2. A formula for calculating the delay time $\Delta t$ of this time of photographing is $\Delta t=t1-t2$.

S15. Obtain an average value of at least two delay times to generate a standard delay time caused by an operation of the user on the photographing device.

On a basis of cyclic imaging, a delay time $\Delta t_i$ (i is a quantity of times of photographing, i=1, 2, 3, . . . ) of multiple times of photographing performed by a same user by using the photographing device to loop through steps S12 to S14 can be obtained; a delay time corresponding to n times of photographing is obtained, and an average value ΔT, that is, $$\Delta T = \frac{1}{n} \sum_{i=1}^{i=n} \Delta t_i,$$

is calculated by using a direct averaging method, where n is an integer greater than 1. In addition, for the purpose of reducing an accidental error, if delay times corresponding to at least four times of photographing (that is, when n>4) are obtained, the greatest value $\Delta t_{i\_max}$ and the smallest value $\Delta t_{i\_min}$ may be removed and an average value of remaining delay times is calculated to obtain ΔT, that is, $$\Delta T = \frac{1}{n-2} \left( \sum_{i=1}^{i=n} \Delta t_i - \Delta t_{i\_max} - \Delta t_{i\_min} \right).$$

Because the foregoing average value ΔT is an average value of delay times of multiple times of photographing, an accidental error of a single time of photographing is reduced, and ΔT may be directly used as the corresponding standard delay time caused by an operation of the user on the photographing device.

It can be learned from the foregoing technical solutions that, according to this embodiment of the present application, a photographing device is controlled to form, according to a preset imaging cycle, an image of a photographed object and store an imaged photo; each time photographing is initiated, an imaged photo is displayed and a first operation instruction entered by a user is received; a corresponding target imaged photo is determined according to the first operation instruction; and then a difference between an initiation moment of each time of photographing and an imaging moment of the corresponding target imaged photo is calculated to obtain a delay time corresponding to a single time of photographing; an average value of delay times corresponding to at least two times of photographing is calculated, where the average value may be used as a standard delay time caused by an operation of the user on the photographing device. Therefore, to determine a standard delay time caused by an operation of a specific user on a photographing device, only the foregoing operations need to be performed in a process in which the specific user performs photographing by using this photographing device, so that the corresponding standard delay time can be obtained. Compared with using a delay time corresponding to any time of photographing, using an average value of delay times corresponding to multiple times of photographing as a standard delay time can reduce an accidental error, and applying the average value in a photographing process allows an obtained photo to be closer to a photo that the user wants to photograph, so that a photographing effect is improved.

In a feasible embodiment of the present application, after being powered on, the photographing device may start to perform the foregoing cyclic imaging and store the imaged photo, till the photographing device is powered off. If storage space of the buffer is insufficient in a process in which the photographing device is powered on and operating, stored earliest imaged photos may be deleted one by one, so that a new imaged photo may be stored.

In another feasible embodiment of the present application, to reduce a waste of storage space, cyclic imaging is not performed during an interval between two adjacent times of photographing, and a start moment and an end moment for cyclic imaging are separately configured for each time of photographing. Specifically, the start moment may be set as a preparation moment t0 before each time of photographing, and the end moment may be set as an initiation moment t1 of this time of photographing (that is, the cyclic imaging is performed only in a time period from t0 to t1), where an imaged photo corresponding to the t1 moment is a delayed photo that is obtained by the existing photographing device. In addition, if the user sends a photographing initiation instruction too early, the picture that the user wants to photograph may have not yet appeared before the photographing initiation moment arrives. To ensure that the picture that the user wants to photograph can also be successfully obtained in this case, the end moment may also be set as a moment t1+t', that is, t1 has elapsed and when a time interval between the end moment and t1 reaches a preset duration t' (that is, the cyclic imaging is performed in a time period from t0 to t1+t'). The foregoing preparation moment may be a moment on which the photographing device receives a focus instruction. Different photographing devices receive the focus instruction in different specific manners. For example, for a photographing device such as a single-lens reflex camera with a two-stage shutter button, if it is detected that the shutter button is pressed till the first stage of the button range, it is determined that the focus instruction is received; for a photographing device such as a mobile phone with a touchscreen, if it is detected that the touchscreen is touched, it is determined that the focus instruction is received. If storage space of the buffer is insufficient in a process in which the photographing device is powered on and operating, imaged photos corresponding to the earliest photographing that are stored in the buffer may be deleted in batches.

In this embodiment of the present application, in step S12 of the foregoing embodiment, after the photographing device initiates photographing, all imaged photos stored in the buffer may be displayed non-selectively, or a quantity of displayed imaged photos may be controlled by using a certain method, so that a target imaged photo is determined quickly.

In the foregoing embodiment in which the start moment and the end moment of cyclic imaging are separately configured for each time of photographing, first the start moment t0' and the end moment t1' of the cyclic imaging corresponding to this time of photographing may be determined, and then the display control is performed to display only an imaged photo whose imaging moment is between t0' and t1'; because the target imaged photo of this time of photographing does not exist among an imaged photo of a remaining time period, filtering the imaged photo of the remaining time period in step S12 in this embodiment of the present application can reduce a quantity of to-be-displayed imaged photos, so that the user does not need to manually filter displayed imaged photos and may determine the target imaged photo more quickly.

In the foregoing embodiment in which the photographing device starts to perform cyclic imaging after being powered on, a quantity of displayed imaged photos may be controlled by using the following steps: determining, according to an initiation moment and a preset time interval of this time of photographing, a photo display time period corresponding to this time of photographing; displaying an imaged photo whose imaging moment is within the photo display time period.

The start moment t1−Δ1 of the photo display time period is obtained by subtracting one preset time interval Δ1 from initiation moment t1 of the photographing, and the end moment t1+Δ2 of the photo display time period is obtained by adding another preset time interval Δ2 to the t1, that is, the photo display time period is [t1−Δ1, t1+Δ2]. The Δ1 and Δ2 are two preset time intervals, where the preset time intervals may be equal or unequal.

For example, it is assumed that the initiation moment of this time of photographing is the $100^{th}$ second after the photographing device is powered on, Δ1=5 seconds, and Δ2=2 seconds; it can be determined that a photo display time period corresponding to this time of photographing is [95 s, 102 s], that is, only an imaged photo whose imaging moment is between the $95^{th}$ second and the $102^{nd}$ second is displayed.

In this embodiment, only an imaged photo whose imaging moment is within an earlier or later period of time of the initiation moment (that is, the foregoing photo display time period) is displayed; in an imaged photo that is imaged in another time period, because an interval between its imaging moment and the photographing initiation moment is relatively long, the target imaged photo does not exist, and therefore filtering the imaged photo that is imaged in another time period in step S12 can reduce a quantity of to-be-displayed imaged photos and simplify an operation step of the user, so that the user does not need to manually filter displayed imaged photos and may determine the target imaged photo more quickly.

In addition, for a same time of photographing (that is, the initiation moment is fixed), a shorter preset time interval indicates a shorter photo display time period that is determined and a smaller quantity of imaged photos that are finally displayed; and therefore a quantity of displayed imaged photos can be changed by changing a value of the preset time interval according to an actual application requirement.

In a feasible implementation manner of the present application, to-be-displayed imaged photos may be sequentially displayed in an independent display manner. To facilitate a user in comparing different imaged photos and accurately determining a target imaged photo, in another feasible implementation manner of the present application, an overlapping display manner may also be used to display multiple imaged photos by overlapping them according to different transparencies.

Figure 2:
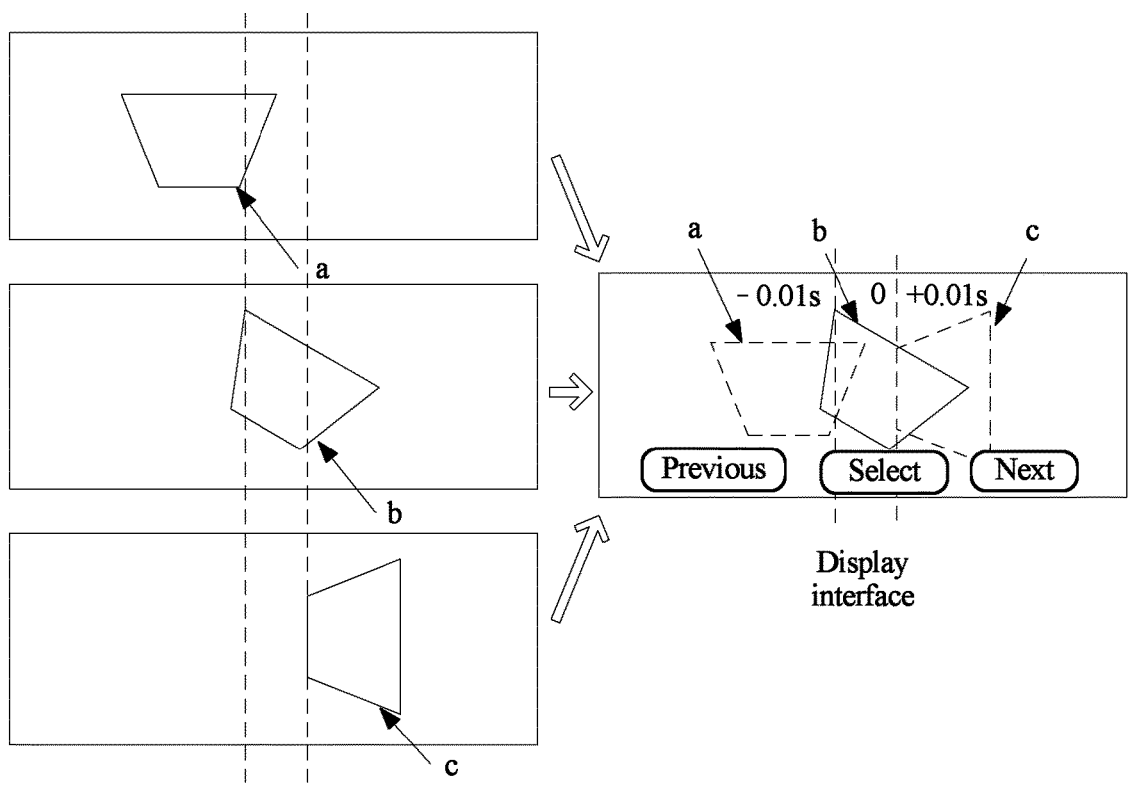
FIG. 2 is a schematic diagram of a display interface when an imaged photo is displayed in a method for determining a photographing delay time according to an embodiment of the present application.

As shown in FIG. 2, three consecutive imaging cycles of imaged photos may be overlapped for displaying. It is assumed that the three imaged photos are separately imaged photos of the first, the second, and the third imaging cycles, and locations and states of corresponding photographed objects are shown as a, b, and c, respectively; edges of the three imaged photos are aligned, the three photos are placed in an overlapping manner, and different transparencies are set for the three photos. It is assumed that the imaged photo of the second imaging cycle is a primary display photo, and its transparency is the highest (for example, the transparency may be set to 100%, which is represented by solid lines in FIG. 2), and located at the lowest layer, and the other two imaged photos have lower transparencies (for example, both are set to 50%, or one is set to 70% and the other is set to 40%, which are represented by dashed lines in FIG. 2) and are located at an upper layer of the imaged photo of the second imaging cycle (for example, the imaged photo of the first imaging cycle is located at the middle layer, and the imaged photo of the third imaging cycle is located at the uppermost layer). In this embodiment of the present application, different transparencies are set for imaged photos to ensure that an imaged photo located at an upper layer has a lower transparency than an imaged photo located at a lower layer, so that a user can see the imaged photo located at the lowest layer through the imaged photo located at the upper layer, that is, overlapping display of multiple imaged photos is implemented.

In addition, still referring to FIG. 2, the user may tap a "Select" control to generate and send a first operation instruction, so as to store a current primary display photo as a target imaged photo in a nonvolatile memory; or the user may switch from a primary display photo to the imaged photo of the third imaging cycle by tapping a "Next" control, to display the imaged photos of the second, the third, and the fourth imaging cycles on corresponding display interfaces. In addition, imaging moments of all imaged photos or a difference between imaging moments of all imaged photos may also be displayed on the display interface. For example, in the three imaged photos shown in FIG. 2, the imaged photo on which b is located is used as a benchmark; an imaging moment of the imaged photo on which a is located is 0.01 second earlier than that of b, and a difference is shown as −0.01 s; and an imaging moment of the imaged photo on which c is located is 0.01 second later than that of b, and a difference is shown as +0.01 s.

In the foregoing embodiment, imaged photos are overlapped for displaying, so that the user can distinguish between relative locations or states of the photographed object in different imaged photos, and then can select a satisfactory imaged photo more accurately and more quickly, that is, input the first operation instruction more quickly and then can determine the target imaged photo more quickly, which improves the execution efficiency of this embodiment.

In addition, in this embodiment of the present application, a value of the imaging cycle T also affects accuracy of the standard delay time. A smaller T indicates a shorter time interval between two adjacent imaged photos, and that an imaged photo closer to the photo the user wants to photograph can be obtained, so that a determined standard delay time has a higher accuracy, but a higher capacity of the buffer is required. Therefore, in a case in which the capacity of the buffer permits, for the purpose of reaching a higher accuracy, a possibly minimized imaging cycle may be set.

In this embodiment of the present application, delay times of multiple times of photographing may be obtained by looping through the foregoing steps S12 to S14. In a feasible embodiment of the present application, a quantity of photographing times m may be preset. When a quantity of loop times of steps S12 to S14 is equal to m, that is, m delay times corresponding to the first time of photographing to the $m^{th}$ time of photographing are obtained, and that is, when a corresponding user already completes m times of photographing, looping stops, an average value of the m delay times is calculated and the average value is used as the foregoing standard delay time, where m is an integer greater than 1.

In the foregoing embodiment, one calculation of an average value is performed only after m delay times are obtained, and then the average value of the m delay times is used as the standard delay time. A greater m indicates a higher accuracy of the average delay time obtained by means of calculation, so that accuracy of a finally determined standard delay time is higher; and correspondingly, a greater m indicates that a longer time is required for determining the standard delay time.

Figure 3:
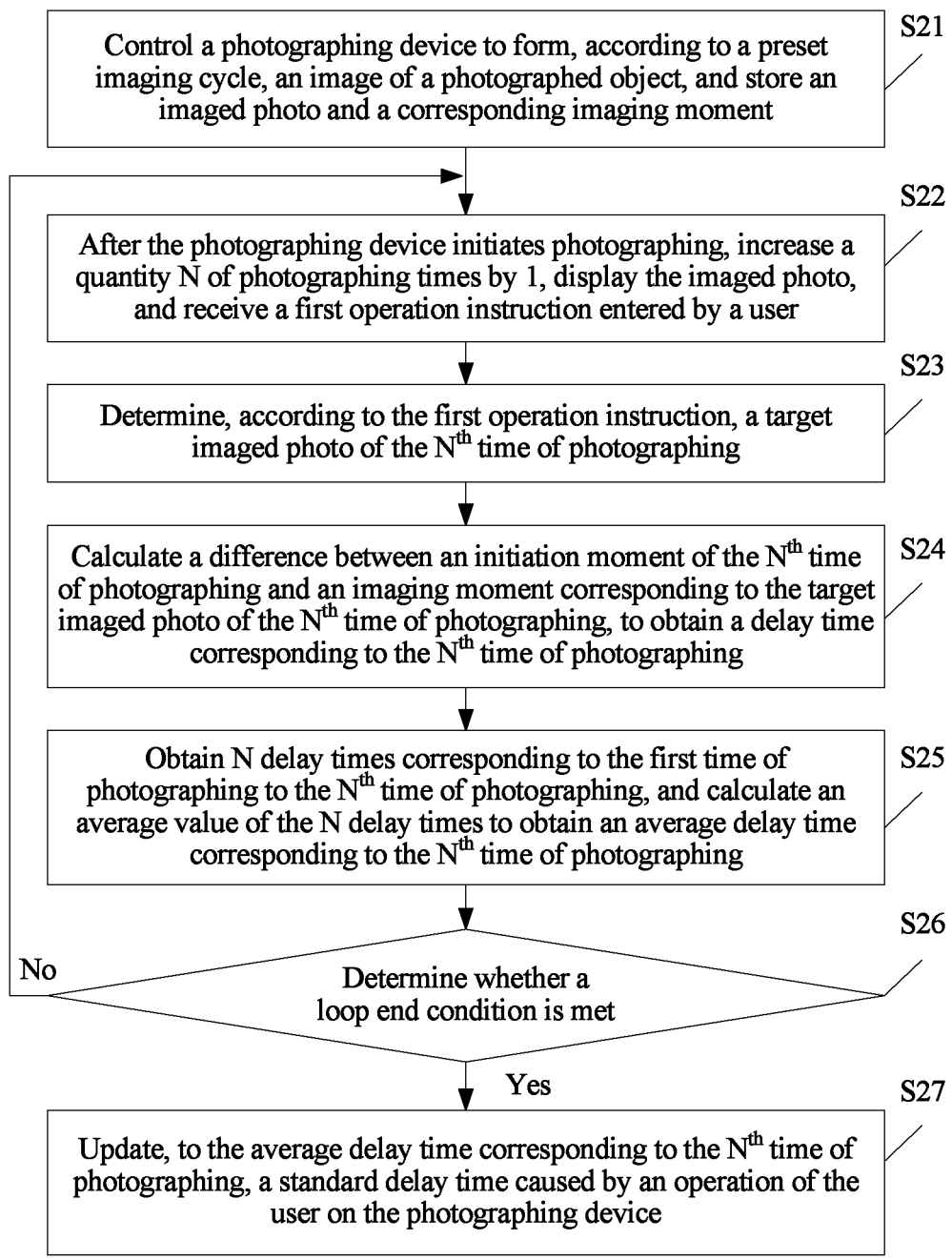
FIG. 3 is a flowchart of another method for determining a photographing delay time according to an embodiment of the present application.

Referring to FIG. 3, for the purpose of improving accuracy of a standard delay time, in another feasible embodiment of the present application, a method for determining a photographing delay time may include the following steps:

S21. Control a photographing device to form, according to a preset imaging cycle, an image of a photographed object, and store an imaged photo and a corresponding imaging moment.

S22. After the photographing device initiates photographing, increase a quantity N of photographing times by 1, display the imaged photo, and receive a first operation instruction entered by a user.

N is an integer and its initial value is 0.

S23. Determine, according to the first operation instruction, a target imaged photo of the $N^{th}$ time of photographing.

S24. Calculate a difference between an initiation moment of the $N^{th}$ time of photographing and an imaging moment corresponding to the target imaged photo of the $N^{th}$ time of photographing, to obtain a delay time corresponding to the $N^{th}$ time of photographing.

S25. Obtain N delay times corresponding to the first time of photographing to the $N^{th}$ time of photographing, and calculate an average value of the N delay times to obtain an average delay time corresponding to the $N^{th}$ time of photographing.

In this embodiment of the present application, the average delay time $\Delta T_N$ corresponding to the $N^{th}$ time of photographing may be calculated by using the foregoing direct averaging method, and a formula is $$\Delta T_N = \frac{1}{N} \sum_{i=1}^{i=N} \Delta t_i.$$

S26. Determine whether a loop ending condition is met; if the loop ending condition is met, perform step S27; if the loop ending condition is not met, return to step S22.

S27. Update, to the average delay time corresponding to the $N^{th}$ time of photographing, a standard delay time caused by an operation of the user on the photographing device.

In the foregoing embodiment, the loop stop condition is used to determine whether the average delay time corresponding to the $N^{th}$ time of photographing may be used as the standard delay time, so that the photographing device can automatically and accurately determine, in a case in which the user does not need to input an operation instruction, a target imaged photo of each time of photographing.

In a feasible embodiment of the present application, the foregoing loop ending condition may be set as: N>1, and a difference between the average delay time corresponding to the $N^{th}$ time of photographing and an average delay time corresponding to the $(N-1)^{th}$ time of photographing is within a preset range; that is, step S26 is specifically determining whether the following are met: N>1, and $\Delta T_N - \Delta T_{N-1}$ is within the preset range.

The above may be set according to an actual application requirement, for example, [−0.1 s, 0.1 s]. A shorter time period covered by the preset range indicates a more accurate standard delay time that is finally determined. If $\Delta T_N - \Delta T_{N-1}$ is within the preset range, it indicates that the delay time $\Delta t_N$ corresponding to the $N^{th}$ time of photographing has a relatively little impact on the average delay time, that is, $\Delta T_N$ already approaches an average value of an infinite quantity of delay times and may be used as the standard delay time.

Figure 4:
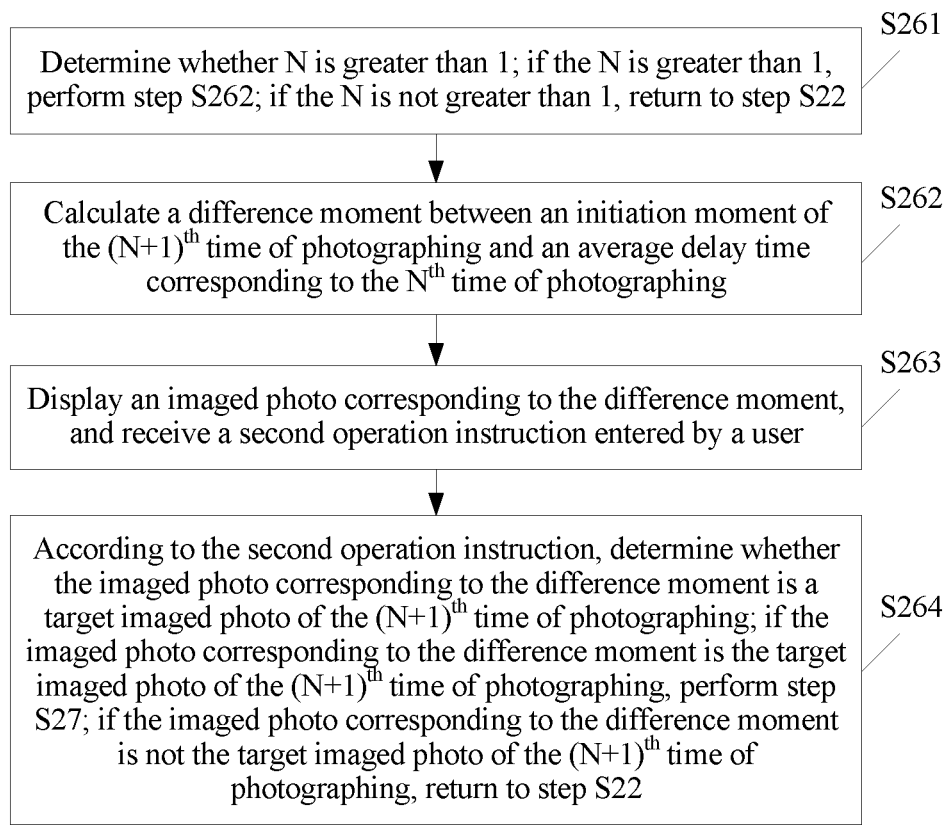
FIG. 4 is a flowchart of a method of determining whether a loop ending condition is met in a method for determining a photographing delay time according to an embodiment of the present application.

In another feasible embodiment of the present application, the foregoing loop ending condition may also be set as: N>1, and an imaged photo corresponding to a difference moment between an initiation moment of the $(N+1)^{th}$ time of photographing and the average delay time corresponding to the $N^{th}$ time of photographing is a target imaged photo of the $(N+1)^{th}$ time of photographing. Referring to FIG. 4, based on the loop ending condition, the foregoing determining whether the loop ending condition is met may include the following steps:

S261. Determine whether N is greater than 1; if the N is greater than 1, perform step S262; if the N is not greater than 1, return to step S22.

S262. After a photographing device initiates photographing again, that is, the $(N+1)^{th}$ time of photographing is initiated, calculate a difference moment $t2'_{N+1}$ between an initiation moment $t1_{N+1}$ of the $(N+1)^{th}$ time of photographing and an average delay time $\Delta T_N$ corresponding to the $N^{th}$ time of photographing.

S263. Display an imaged photo corresponding to the difference moment $t2'_{N+1}$ and receive a second operation instruction entered by a user.

S264. According to the second operation instruction, determine whether the imaged photo corresponding to the difference moment $t2'_{N+1}$ is the target imaged photo of the $(N+1)^{th}$ time of photographing; if the imaged photo corresponding to the difference moment $t2'_{N+1}$ is the target imaged photo of the $(N+1)^{th}$ time of photographing, perform step S27; if the imaged photo corresponding to the difference moment $t2'_{N+1}$ is not the target imaged photo of the $(N+1)^{th}$ time of photographing, return to step S22.

Figure 5:
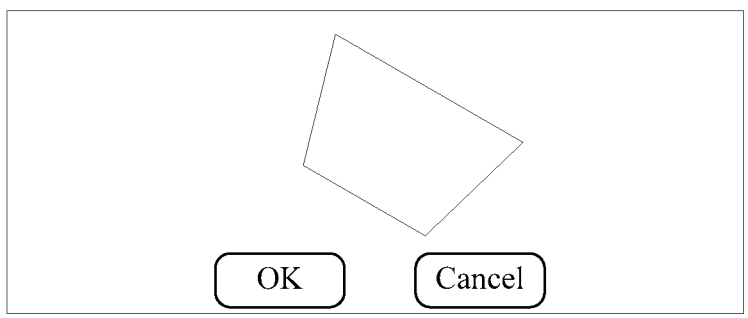
FIG. 5 is a schematic diagram of a display interface based on the method shown in FIG. 4.

In this embodiment, a formula for calculating the difference moment $t2'_{N+1}$ is $t2'_{j+1} = t1_{j+1} - \Delta T_j$. After the display interface shown in FIG. 5 displays, to the user, the imaged photo corresponding to the difference moment $t2'_{N+1}$, if the user determines that the imaged photo is a photo the user wants to photograph, an "OK" control may be tapped to generate a corresponding second operation instruction; or if the user determines that the imaged photo is not a photo the user wants to photograph, the user may tap a "Cancel" control to generate a corresponding second operation instruction.

If the second operation instruction corresponding to the "OK" control is received, it is determined that the imaged photo corresponding to the difference moment $t2'_{N+1}$ is the target imaged photo of the $(N+1)^{th}$ time of photographing, and it indicates that the photographing device may automatically determine, according to $\Delta T_N$, the target imaged photo of the $(N+1)^{th}$ time of photographing, and therefore the standard delay time may be updated to $\Delta T_N$. On the contrary, if the second operation instruction corresponding to the "Cancel" control is received, it is determined that the imaged photo corresponding to the difference moment $t2'_{N+1}$ is not the target imaged photo of the $(N+1)^{th}$ time of photographing, and it indicates that the photographing device cannot accurately determine, according to $\Delta T_N$, the target imaged photo of the $(N+1)^{th}$ time of photographing, and therefore the standard delay time cannot be updated to $\Delta T_N$ and step S22 is returned and a next loop is entered.

In the foregoing embodiment, each time photographing is initiated and a corresponding delay time is obtained, one calculation of an average value is performed by looping through steps S22 to S25, to obtain an average value of multiple delay times corresponding to the first time of photographing to this time of photographing, that is, an average delay time corresponding to this time of photographing; if the loop stop condition is met in this case, looping may be stopped, and the standard delay time caused by an operation of the user on the photographing device is updated to the average delay time corresponding to this time of photographing. In this embodiment, a quantity of photographing times does not need to be preset, and the looping automatically stops when a loop stop condition is met, which can not only ensure accuracy of the standard delay time, but also can ensure that a quantity of loop times is minimized, so that the least time is taken to determine the standard delay time.

In addition, in this embodiment of the present application, to further ensure the accuracy of the standard delay time, when it is determined for the first time that the loop ending condition is met, step S22 is still returned and a next loop continues, till it is determined for K consecutive times that the loop ending condition is met, and then the standard delay time is updated to an average delay time obtained at the last time. A specific value of the K may be set by the user according to an actual requirement. If a photographed object changes relatively quickly, that is, a relatively high accuracy is required for the standard delay time, the K may be set to a relatively large value. On the contrary, if a photographed object changes relatively slow, that is, a relatively low accuracy is required for the standard delay time, the K may be set to a relatively small value. It is assumed that k=3; if the consecutive $j^{th}$, $(j+1)^{th}$, and $(j+2)^{th}$ times of consecutive photographing all meet the loop ending condition, the standard delay time may be updated to an average delay time corresponding to the $(j+2)^{th}$ time of photographing; if the $j^{th}$ and the $(j+1)^{th}$ times of photographing both meet the loop ending condition, but the $(j+2)^{th}$ time of photographing does not meet the loop ending condition, the standard delay time is temporarily not determined, but steps S22 to S25 continue to be looped through.

In addition, the standard delay time determined in the foregoing embodiment and a user name corresponding to the user may be stored in a corresponding photographing device. When using the photographing device again, the user directly reads the corresponding standard delay time, and performs a photographing operation based on the standard delay time to obtain the photo that the user wants to photograph.

Based on the standard delay time determined in this embodiment of the present application, the photo that the user wants to photograph may be obtained by using the following photographing control steps in a photographing process:

S01. Control the photographing device to form, according to a preset imaging cycle, an image of a photographed object, and store an imaged photo and a corresponding imaging moment.

S02. After the photographing device initiates photographing, calculate a difference between an initiation moment of this time of photographing and the standard delay time, to obtain a target imaging moment.

S03. Obtain an imaged photo whose imaging moment is closest to the target imaging moment, that is, obtain a target imaged photo of this time of photographing.

For example, the standard delay time determined in this embodiment of the present application is 0.5 s and an initiation moment of a certain time of photographing is the 10 s moment after the photographing device is powered on, a target imaging moment may be calculated and obtained as the 9.5 s (10 s−0.5 s=9.5 s) moment after timing starts; an imaged photo whose imaging moment is closest to 9.5 s, that is, a target imaged photo of this time of photographing, is searched for in stored imaged photos.

It may be learned from the foregoing steps that, after the standard delay time is determined, cyclic imaging is still performed on the photographed object by using the photographing device in the photographing process, and when the photographing device initiates photographing, the target imaging moment corresponding to this time of photographing is automatically calculated according to the initiation moment of this time of photographing and the standard delay time; in actual application, the foregoing target imaging moment may be between two adjacent imaging moments, that is, no imaged photo whose imaging moment is equal to the foregoing target imaging moment exists, and therefore in step S03, the imaged photo whose imaging moment is closest to the target imaging moment is obtained as the target imaged photo.

In addition, because the standard delay time is an average delay time calculated based on delay times of a finite quantity of times of photographing, it is difficult to reach absolute accuracy. Consequently, there is a certain deviation between an actually obtained target imaged photo and a photo that the user wants to photograph. In view of this, the standard delay time may further be corrected in a process in which photographing is performed based on the standard delay time, to improve accuracy of the standard delay time. Specifically, after obtaining the target imaged photo by performing steps S01 to S03, the photographing device further performs the following correction steps:

S04. Obtain, as a contrastive imaged photo, at least one imaged photo whose imaging moment is closest to the imaging moment of the target imaged photo.

For example, it is assumed that a target imaging moment corresponding to the target imaged photo is the 9.6 s moment after the photographing device is powered on, and an imaging cycle is 0.1 s; imaged photos corresponding to imaging moments before and after the target imaging moment, that is, imaged photos whose imaging moments are the 9.5 s and 9.7 s after the photographing device is powered on, may be used as the contrastive imaged photos.

S05. Display the target imaged photo and the contrastive imaged photo and receive an operation instruction of the user.

Preferably, the foregoing overlapping display manner in the foregoing embodiment is used to display the target imaged photo and the contrastive imaged photo, where the target imaged photo may be a primary display photo and configured with transparency higher than that of the contrastive imaged photo. For the display interface, reference may be made to FIG. 2, and details are not described herein again.

S06. If the received operation instruction is a first determining instruction used to represent that the user is satisfied with the contrastive imaged photo, correct the standard delay time according to a corresponding imaging moment of the contrastive imaged photo and the photographing initiation moment.

After the target imaged photo and the contrastive imaged photo are displayed, by comparing the two types of photos, the user may determine which one is closer to the photo the user wants to photograph, and then perform a corresponding operation. If the user selects the target imaged photo as the photo the user wants to photograph, that is, the received operation instruction is a second determining instruction used to represent that the user is satisfied with the target imaged photo, no correction is performed on the standard delay time; if the user selects the contrastive imaged photo as the photo the user wants to photograph, that is, the first determining instruction is received, a difference between the photographing initiation moment and an imaging moment of the contrastive imaged photo is calculated to obtain a delay time of this time of photographing, an average value of the delay time of this time of photographing and the standard delay time is calculated, and the standard delay time is updated to be the average value.

To prevent impact of an accidental error, each time the first determining instruction is received, the delay time of this time of photographing only may be calculated and stored, and the standard delay time is not corrected temporarily, but an average value of corresponding multiple delay times and the standard delay time is calculated after the first determining instruction is received for multiple consecutive times (for example, 5 times), to obtain a corrected standard delay time.

Figure 6:
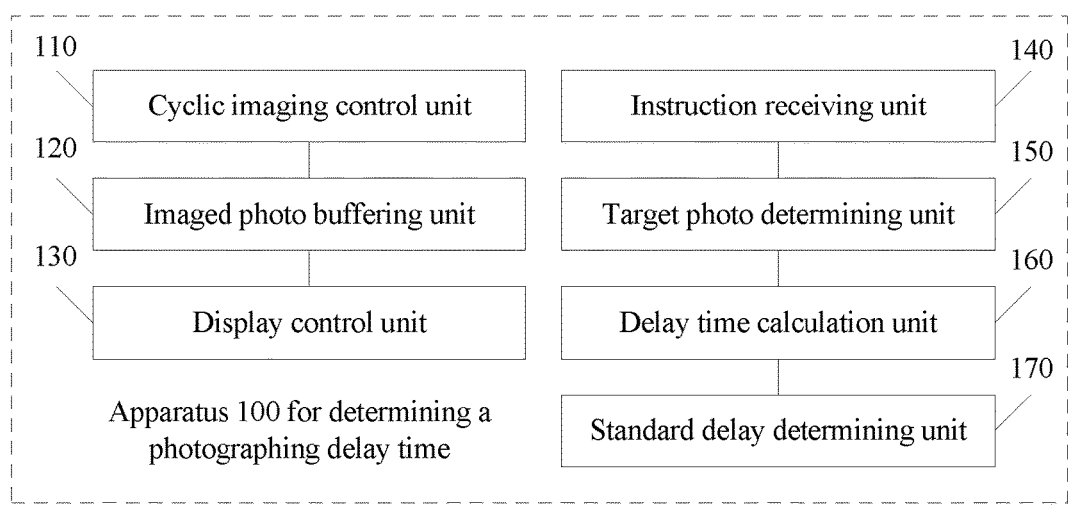
FIG. 6 is a structural block diagram of an apparatus for determining a photographing delay time according to an embodiment of the present application.

On the other hand, corresponding to the foregoing method embodiment, this embodiment of the present application further provides an apparatus for determining a photographing delay time, where the apparatus is applied in a photographing device. As shown in FIG. 6, the apparatus 100 for determining a photographing delay time includes a cyclic imaging control unit 110, an imaged photo buffering unit 120, a display control unit 130, an instruction receiving unit 140, a target photo determining unit 150, a delay time calculation unit 160, and a standard delay determining unit 170.

The cyclic imaging control unit 110 is configured to control the photographing device to form, according to a preset imaging cycle, an image of a photographed object.

The imaged photo buffering unit 120 is configured to store an imaged photo and a corresponding imaging moment.

The display control unit 130 is configured to: after the photographing device initiates photographing, display the imaged photo stored in the imaged photo buffering unit 120.

The instruction receiving unit 140 is configured to receive a first operation instruction entered by a user.

The target photo determining unit 150 is configured to determine, according to the first operation instruction received by the instruction receiving unit 140, a target imaged photo of this time of photographing.

The delay time calculation unit 160 is configured to calculate a difference between an initiation moment of this time of photographing and an imaging moment corresponding to the target imaged photo, to obtain a delay time corresponding to this time of photographing.

The standard delay determining unit 170 is configured to obtain an average value of at least two delay times to generate a standard delay time caused by an operation of the user on the photographing device.

It can be learned from the foregoing technical solutions that, according to this embodiment of the present application, a photographing device is controlled to form, according to a preset imaging cycle, an image of a photographed object and store an imaged photo; each time photographing is initiated, an imaged photo is displayed and a first operation instruction entered by a user is received; a corresponding target imaged photo is determined according to the first operation instruction; and then a difference between an initiation moment of each time of photographing and an imaging moment of the corresponding target imaged photo is calculated to obtain a delay time corresponding to a single time of photographing; an average value of delay times corresponding to at least two times of photographing is calculated, where the average value may be used as a standard delay time caused by an operation of the user on the photographing device. Therefore, to determine a standard delay time caused by an operation of a specific user on a photographing device, only the foregoing operations need to be performed in a process in which the specific user performs photographing by using this photographing device, so that the corresponding standard delay time can be obtained. Compared with using a delay time corresponding to any time of photographing, using an average value of delay times corresponding to multiple times of photographing as a standard delay time can reduce an accidental error, and applying the average value in a photographing process allows an obtained photo to be closer to a photo that the user wants to photograph, so that a photographing effect is improved.

In this embodiment of the present application, the display control unit 130 may non-selectively display all imaged photos stored in the imaged photo buffering unit 120, or may control a quantity of displayed imaged photos by using a certain method, to quickly determine the target imaged photo.

Figure 7:
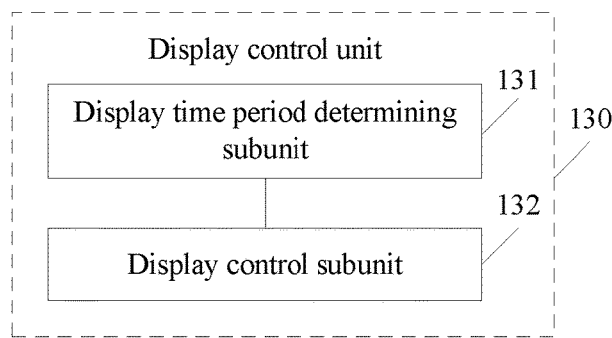
FIG. 7 is a structural block diagram of a display control unit in an apparatus for determining a photographing delay time according to an embodiment of the present application.

As shown in FIG. 7, the display control unit 130 may include a display time period determining subunit 131 and a display control subunit 132.

The display time period determining subunit 131 is configured to determine, according to the initiation moment of this time of photographing and a preset time interval, a photo display time period corresponding to this time of photographing. The display control subunit 132 is configured to display an imaged photo whose imaging moment is within the photo display time period.

In the foregoing embodiment, the display time period determining subunit 131 determines a photo display time period, and the display control subunit 132 performs display control to display only an imaged photo whose imaging moment is within the photo display time period; for an imaged photo that is imaged on another moment, an interval between the imaging moment and a photographing initiation moment is relatively long, and no target imaged photo exists. The display control unit 130 shown in FIG. 7 may filter, before performing a display action, an imaged photo whose imaging moment is relatively far away from the photographing initiation moment, to reduce a quantity of to-be-displayed imaged photos, so that the user does not need to manually filter displayed imaged photos and may determine the target imaged photo more quickly.

In a feasible implementation manner of the present application, the display control unit 130 or the foregoing display control subunit 132 may sequentially display to-be-displayed imaged photos in an independent display manner.

To facilitate a user in comparing different imaged photos and accurately determining a target imaged photo, in another feasible implementation manner of the present application, the display control unit 130 or the foregoing display control subunit 132 may be specifically an overlapping display control subunit, where the overlapping display control subunit is configured to display multiple imaged photos by overlapping them according to different transparencies. In this embodiment, multiple imaged photos are displayed at the same time in the overlapping display manner, so that the user can distinguish between relative locations or states of the photographed object in different imaged photos, and then can determine a target imaged photo more accurately; in addition, incompletely same transparencies are configured for the multiple imaged photos that are overlapped for displaying, to facilitate distinguishing between different imaged photos on a same display interface.

In a feasible implementation manner of the present application, the standard delay determining unit 170 may include a third averaging subunit, configured to obtain a delay time of a preset quantity of times of photographing, and calculate an average value of the delay time of the preset quantity of times of photographing, to obtain the standard delay time caused by the operation of the user on the photographing device. In this embodiment, one calculation of an average value is performed only after the delay time of the preset quantity of times of photographing is obtained, and the obtained average value is used as the standard delay time. A greater preset quantity of times of photographing indicates a higher accuracy of the average delay time obtained by means of calculation, so that accuracy of a finally determined standard delay time is higher; and correspondingly, a greater preset quantity of times of photographing indicates that a longer time is required for determining the standard delay time.

Figure 8:
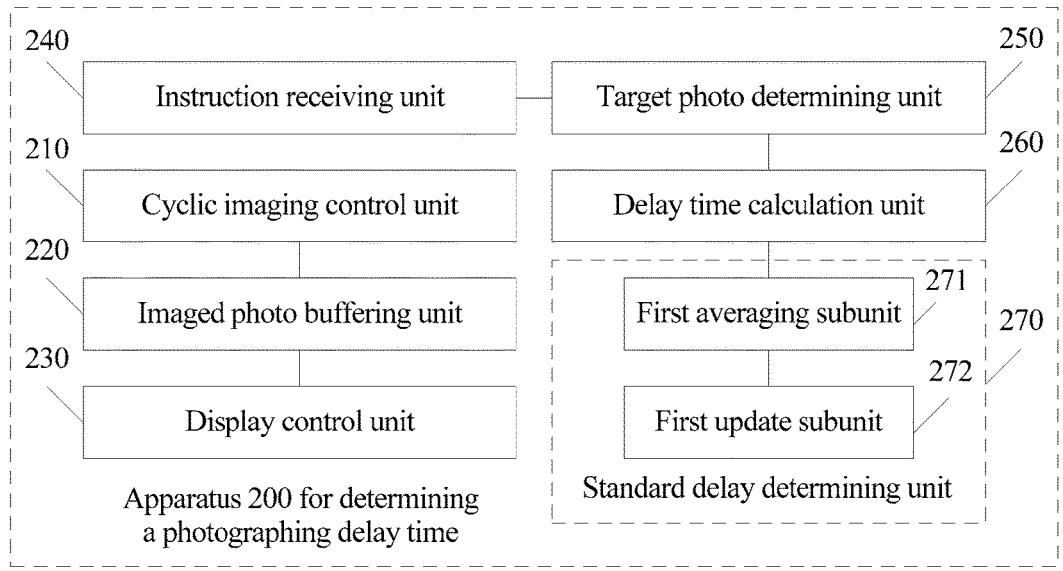
FIG. 8 is a structural block diagram of another apparatus for determining a photographing delay time according to an embodiment of the present application.

FIG. 8 is a structural block diagram of another apparatus for determining a photographing delay time according to an embodiment of the present application. The apparatus 200 for determining a photographing delay time is applied in a photographing device and includes: a cyclic imaging control unit 210, an imaged photo buffering unit 220, a display control unit 230, an instruction receiving unit 240, a target photo determining unit 250, a delay time calculation unit 260, and a standard delay determining unit 270.

The cyclic imaging control unit 210 is configured to control the photographing device to form, according to a preset imaging cycle, an image of a photographed object. The imaged photo buffering unit 220 is configured to store an imaged photo and a corresponding imaging moment. The display control unit 230 is configured to: after the photographing device initiates photographing, display the imaged photo stored in the imaged photo buffering unit 220. The instruction receiving unit 240 is configured to receive a first operation instruction entered by a user. The target photo determining unit 250 is configured to determine, according to the first operation instruction, a target imaged photo of this time of photographing. The delay time calculation unit 260 is configured to calculate a difference between an initiation moment of this time of photographing and an imaging moment corresponding to the target imaged photo, to obtain a delay time corresponding to this time of photographing.

The standard delay determining unit 270 includes a first averaging subunit 271 and a first update subunit 272.

The first averaging subunit 271 is configured to obtain N delay times corresponding to the first time of photographing to the $N^{th}$ time of photographing performed by the user, and calculate an average value of the N delay times to obtain an average delay time corresponding to the $N^{th}$ time of photographing, where N is an integer greater than 1.

The first update subunit 272 is configured to: when a difference between the average delay time corresponding to the $N^{th}$ time of photographing and an average delay time corresponding to the $(N-1)^{th}$ time of photographing is within a preset range, update, to the average delay time corresponding to the $N^{th}$ time of photographing, the standard delay time caused by the operation of the user on the photographing device.

In this embodiment, each time photographing is initiated and a corresponding delay time is obtained, one calculation of an average value is performed to obtain an average delay time corresponding to this time of photographing; when the average delay time is stable, looping may stop, and the stable average delay time is used as the standard delay time caused by the operation of the user on the photographing device. In this embodiment, a loop threshold does not need to be preset, and the looping automatically stops when an average delay time is stable, which can not only ensure accuracy of the standard delay time, but also can ensure that a quantity of loop times is minimized, so that the least time is taken to determine the standard delay time.

Figure 9:
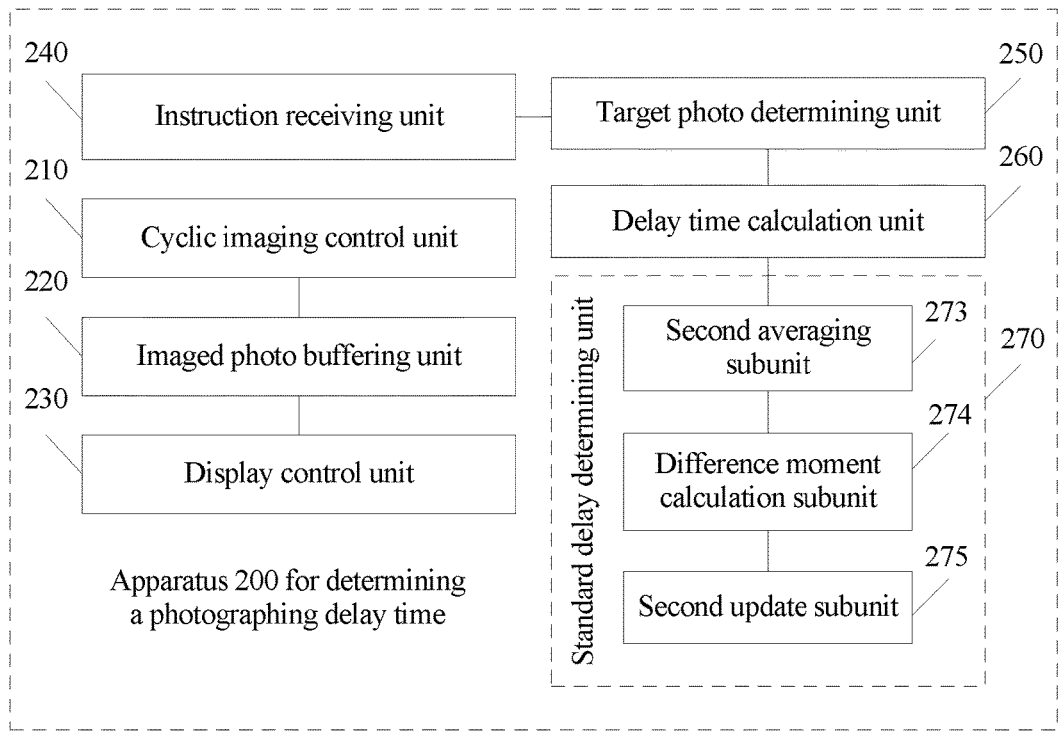
FIG. 9 is a structural block diagram of still another apparatus for determining a photographing delay time according to an embodiment of the present application.

FIG. 9 is a structural block diagram of still another apparatus for determining a photographing delay time according to an embodiment of the present application. The apparatus 200 for determining a photographing delay time is applied in a photographing device and includes: a cyclic imaging control unit 210, an imaged photo buffering unit 220, a display control unit 230, an instruction receiving unit 240, a target photo determining unit 250, a delay time calculation unit 260, and a standard delay determining unit 270.

The cyclic imaging control unit 210 is configured to control the photographing device to form, according to a preset imaging cycle, an image of a photographed object. The imaged photo buffering unit 220 is configured to store an imaged photo and a corresponding imaging moment. The display control unit 230 is configured to: after the photographing device initiates photographing, display the imaged photo stored in the imaged photo buffering unit 220. The instruction receiving unit 240 is configured to receive a first operation instruction entered by a user. The target photo determining unit 250 is configured to determine, according to the first operation instruction, a target imaged photo of this time of photographing. The delay time calculation unit 260 is configured to calculate a difference between an initiation moment of this time of photographing and an imaging moment corresponding to the target imaged photo, to obtain a delay time corresponding to this time of photographing.

The standard delay determining unit 270 includes: a second averaging subunit 273, a difference moment calculation subunit 274, and a second update subunit 275.

The second averaging subunit 273 is configured to obtain N delay times corresponding to the first time of photographing to the $N^{th}$ time of photographing performed by the user, and calculate an average value of the N delay times to obtain an average delay time corresponding to the $N^{th}$ time of photographing, where N is an integer greater than 1.

The difference moment calculation subunit 274 is configured to calculate a difference moment between an initiation moment corresponding to the $(N+1)^{th}$ time of photographing and the average delay time corresponding to the $N^{th}$ time of photographing.

The second update subunit 275 is configured to: if an imaged photo corresponding to the difference moment is a target imaged photo of the $(N+1)^{th}$ time of photographing, update, to the average delay time corresponding to the $N^{th}$ time of photographing, the standard delay time caused by the operation of the user on the photographing device.

In the embodiments corresponding to FIG. 8 and FIG. 9, the display control unit 230, the instruction receiving unit 240, the target photo determining unit 250, and the delay time calculation unit 260 work alternately. Each time photographing is initiated and a corresponding delay time is obtained, one calculation of an average value is performed to obtain an average value of multiple delay times corresponding to the first time of photographing to this time of photographing, that is, an average delay time corresponding to this time of photographing; if a loop stop condition is met in this case, looping may stop, and the standard delay time caused by an operation of the user on the photographing device is updated to the average delay time corresponding to this time of photographing. In this embodiment, a quantity of photographing times does not need to be preset, and the looping automatically stops when a loop stop condition is met, which can not only ensure accuracy of the standard delay time, but also can ensure that a quantity of loop times is minimized, so that the least time is taken to determine the standard delay time.

An embodiment of the present application further provides a computer storage medium, where the computer storage medium stores a program. When the program in the storage medium is executed by a processor of a photographing device, the photographing device is enabled to perform some or all of steps in the method for determining a photographing delay time recorded in the foregoing method embodiments.

Figure 10:
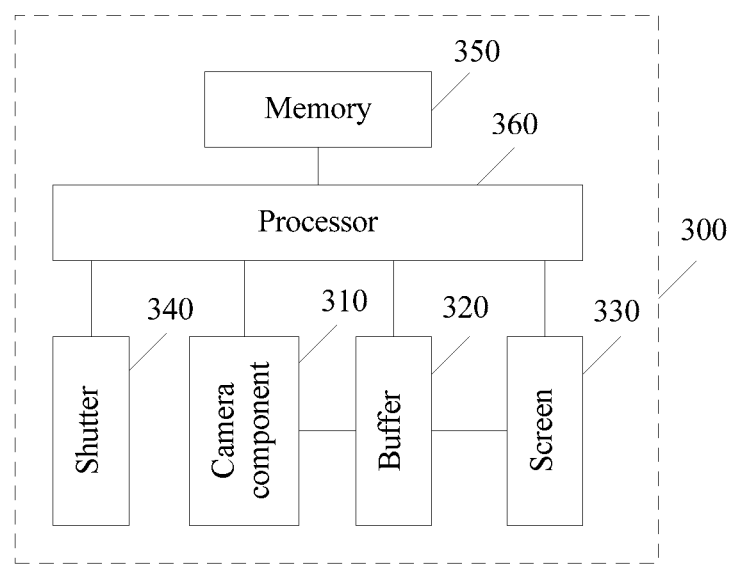
FIG. 10 is a block diagram of a photographing device according to an embodiment of the present application.

Referring to FIG. 10, an embodiment of the present application further provides a photographing device 300, including: a camera component 310, a buffer 320, a screen 330, a shutter 340, a memory 350, and a processor 360.

The camera component 310 includes parts such as a lens, a photosensitive element, and an image processor, and is configured to obtain a photographed picture in an optical signal form and form an image of the photographed picture to generate a corresponding imaged photo. The buffer 320 is configured to store the imaged photo outputted by the camera component 310. The screen 330 is configured to display a photo stored in the buffer 320. The shutter 340 is configured to receive a photographing operation of a user to initiate photographing. The shutter 340 may be a physical button on the photographing device, or may be a virtual key on the screen 330. The memory 350 is configured to store an instruction that can be executed by the processor 360. The processor 360 is separately connected to the camera component 310, the buffer 320, the screen 330, the shutter 340, and the memory 350, and is configured to execute the instruction in the memory 350 to coordinate between and control the camera component 310, the buffer 320, the screen 330 and the shutter 340 to complete the foregoing method for determining a photographing delay time.

The processor 360 can complete the following steps by executing the instruction in the memory 350:

controlling the photographing device to form, according to a preset imaging cycle, an image of a photographed object, and storing an imaged photo and a corresponding imaging moment;

after the photographing device initiates photographing, displaying the imaged photo and receiving a first operation instruction entered by a user;

determining, according to the first operation instruction, a target imaged photo of this time of photographing;

calculating a difference between an initiation moment of this time of photographing and an imaging moment corresponding to the target imaged photo, to obtain a delay time corresponding to this time of photographing; and obtaining an average value of at least two delay times to generate a standard delay time caused by an operation of the user on the photographing device.

In a feasible embodiment of the present application, to implement the step of obtaining an average value of at least two delay times to generate a standard delay time caused by an operation of the user on the photographing device, the processor 360 may perform the following steps:

obtaining N delay times corresponding to the first time of photographing to the $N^{th}$ time of photographing performed by the user, and calculating an average value of the N delay times to obtain an average delay time corresponding to the $N^{th}$ time of photographing, where N is an integer greater than 1; and when a difference between the average delay time corresponding to the $N^{th}$ time of photographing and an average delay time corresponding to the $(N-1)^{th}$ time of photographing is within a preset range, updating, to the average delay time corresponding to the $N^{th}$ time of photographing, the standard delay time caused by the operation of the user on the photographing device.

In another feasible embodiment of the present application, to implement the step of obtaining an average value of at least two delay times to generate a standard delay time caused by an operation of the user on the photographing device, the processor 360 may perform the following steps:

obtaining N delay times corresponding to the first time of photographing to the $N^{th}$ time of photographing performed by the user, and calculating an average value of the N delay times to obtain an average delay time corresponding to the $N^{th}$ time of photographing, where N is an integer greater than 1;

calculating a difference moment between an initiation moment corresponding to the $(N+1)^{th}$ time of photographing and the average delay time corresponding to the $N^{th}$ time of photographing; and if an imaged photo corresponding to the difference moment is a target imaged photo of the $(N+1)^{th}$ time of photographing, updating, to the average delay time corresponding to the $N^{th}$ time of photographing, the standard delay time caused by the operation of the user on the photographing device.

In still another feasible embodiment of the present application, to implement the step of obtaining an average value of at least two delay times to generate a standard delay time caused by an operation of the user on the photographing device, the processor 360 may perform the following steps:

obtaining a delay time of a preset quantity of times of photographing, and calculating an average value of the delay time of the preset quantity of times of photographing, to obtain the standard delay time caused by the operation of the user on the photographing device.

In yet another feasible embodiment of the present application, to implement the step of displaying the imaged photo, the processor 360 may perform the following steps:

determining, according to the initiation moment of this time of photographing and a preset time interval, a photo display time period corresponding to this time of photographing; and displaying an imaged photo whose imaging moment is within the photo display time period.

In yet still another feasible embodiment of the present application, to implement the step of displaying the imaged photo, the processor 360 may perform the following steps:

displaying multiple imaged photos by overlapping them according to different transparencies.

The embodiments in this specification are all described in a progressive manner, for same or similar parts in the embodiments, reference may be made to these embodiments, and each embodiment focuses on a difference from other embodiments. Especially, apparatus or system embodiments are basically similar to a method embodiment, and therefore are described briefly; for related parts, reference may be made to partial descriptions in the method embodiment. The described apparatus and system embodiments are merely exemplary. The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments. A person of ordinary skill in the art may understand and implement the embodiments of the present invention without creative efforts.

The present application can be described in the general context of executable computer instructions executed by a computer, for example, a program module. Generally, the program unit includes a routine, program, object, component, data structure, and the like for executing a particular task or implementing a particular abstract data type. The present application may also be practiced in distributed computing environments in which tasks are performed by remote processing devices that are connected by using a communications network. In a distributed computing environment, program modules may be located in both local and remote computer storage media including storage devices.

It should be noted that in this specification, relational terms such as "first" and "second" are only used to distinguish one entity or operation from another, and do not necessarily require or imply that any actual relationship or sequence exists between these entities or operations. Moreover, the terms "include", "comprise", or their any other variant is intended to cover a non-exclusive inclusion, so that a process, a method, an article, or a device that includes a list of elements not only includes those elements but also includes other elements that are not expressly listed, or further includes elements inherent to such a process, method, article, or device. An element preceded by "includes a . . . " does not, without more constraints, preclude the presence of additional identical elements in the process, method, article, or device that includes the element.

The foregoing descriptions are merely specific implementation manners of the present application. It should be noted that a person of ordinary skill in the art may make several improvements or polishing without departing from the principle of the present application and the improvements or polishing shall fall within the protection scope of the present application.

What is claimed is:

1. A method for determining a photographing delay time, wherein the method is applied in a photographing device and comprises:
   controlling the photographing device to form, according to a preset imaging cycle, an image of a photographed object, and storing an imaged photo and a corresponding imaging moment;
   after the photographing device initiates photographing, displaying the imaged photo and receiving a first operation instruction entered by a user;
   determining, according to the first operation instruction, a target imaged photo of this time of photographing;
   calculating a difference between an initiation moment of this time of photographing and an imaging moment corresponding to the target imaged photo, to obtain a delay time corresponding to this time of photographing; and
   obtaining N delay times corresponding to the first time of photographing to the $N^{th}$ time of photographing performed by the user, and calculating an average value of the N delay times to obtain an average delay time corresponding to the $N^{th}$ time of photographing, wherein N is an integer greater than 1; and
   when a difference between the average delay time corresponding to the $N^{th}$ time of photographing and an average delay time corresponding to the $(N-1)^{th}$ time of photographing is within a preset range, updating, to the average delay time corresponding to the $N^{th}$ time of photographing, the standard delay time caused by the operation of the user on the photographing device.

2. The method according to claim 1, wherein the obtaining an average value of at least two delay times to generate a standard delay time caused by an operation of the user on the photographing device comprises:
   obtaining N delay times corresponding to the first time of photographing to the $N^{th}$ time of photographing performed by the user, and calculating an average value of the N delay times to obtain an average delay time corresponding to the $N^{th}$ time of photographing, wherein N is an integer greater than 1;
   calculating a difference moment between an initiation moment corresponding to the $(N+1)^{th}$ time of photographing and the average delay time corresponding to the $N^{th}$ time of photographing; and
   if an imaged photo corresponding to the difference moment is a target imaged photo of the $(N+1)^{th}$ time of photographing, updating, to the average delay time corresponding to the $N^{th}$ time of photographing, the standard delay time caused by the operation of the user on the photographing device.

3. The method according to claim 1, wherein the obtaining an average value of at least two delay times to generate a standard delay time caused by an operation of the user on the photographing device comprises:
   obtaining a delay time of a preset quantity of times of photographing, and calculating an average value of the delay time of the preset quantity of times of photographing, to obtain the standard delay time caused by the operation of the user on the photographing device.

4. The method according to claim 1, wherein the displaying the imaged photo comprises:
   determining, according to the initiation moment of this time of photographing and a preset time interval, a photo display time period corresponding to this time of photographing; and
   displaying an imaged photo whose imaging moment is within the photo display time period.

5. The method according to claim 1, wherein the displaying the imaged photo comprises:
   displaying multiple imaged photos by overlapping them according to different transparencies.

6. A non-transitory computer readable medium, comprising processor-executable instructions stored thereon, which when executed by a hardware processor cause the processor to implement operations for determining a photographing delay time, including:
   controlling the photographing device to form, according to a preset imaging cycle, an image of a photographed object;
   storing an imaged photo and a corresponding imaging moment;
   after photographing is initiated, displaying the imaged photo;
   receiving a first operation instruction entered by a user;
   determining, according to the first operation instruction, a target imaged photo of this time of photographing;
   calculating a difference between an initiation moment of this time of photographing and an imaging moment corresponding to the target imaged photo, to obtain a delay time corresponding to this time of photographing; and
   obtaining N delay times corresponding to the first time of photographing to the $N^{th}$ time of photographing performed by the user, and calculating an average value of the N delay times to obtain an average delay time corresponding to the $N^{th}$ time of photographing, wherein N is an integer greater than 1; and when a difference between the average delay time corresponding to the $N^{th}$ time of photographing and an average delay time corresponding to the $(N-1)^{th}$ time of photographing is within a preset range, updating, to the average delay time corresponding to the $N^{th}$ time of photographing, the standard delay time caused by the operation of the user on the photographing device.

7. The non-transitory computer readable medium according to claim 6, wherein the operations further include:

obtaining N delay times corresponding to the first time of photographing to the $N^{th}$ time of photographing performed by the user, and calculating an average value of the N delay times to obtain an average delay time corresponding to the $N^{th}$ time of photographing, wherein N is an integer greater than 1;

calculating a difference moment between an initiation moment corresponding to the $(N+1)^{th}$ time of photographing and the average delay time corresponding to the $N^{th}$ time of photographing; and if an imaged photo corresponding to the difference moment is a target imaged photo of the $(N+1)^{th}$ time of photographing, updating, to the average delay time corresponding to the $N^{th}$ time of photographing, the standard delay time caused by the operation of the user on the photographing device.

8. The non-transitory computer readable medium according to claim 6, wherein the operations further include:

obtaining a delay time of a preset quantity of times of photographing, and calculating an average value of the delay time of the preset quantity of times of photographing, to obtain the standard delay time caused by the operation of the user on the photographing device.

9. The non-transitory computer readable medium according to claim 6, wherein the operations further include:

determining, according to the initiation moment of this time of photographing and a preset time interval, a photo display time period corresponding to this time of photographing; and displaying an imaged photo whose imaging moment is within the photo display time period.

10. The non-transitory computer readable medium according to claim 6, wherein the operations further include:

displaying multiple imaged photos by overlapping them according to different transparencies.

11. A photographing device, comprising:

a processor; and a memory, configured to store an instruction that can be executed by the processor, wherein the processor is configured to:

control the photographing device to form, according to a preset imaging cycle, an image of a photographed object, and store an imaged photo and a corresponding imaging moment;

after the photographing device initiates photographing, display the imaged photo and receive a first operation instruction entered by a user;

determine, according to the first operation instruction, a target imaged photo of this time of photographing;

calculate a difference between an initiation moment of this time of photographing and an imaging moment corresponding to the target imaged photo, to obtain a delay time corresponding to this time of photographing; and obtain N delay times corresponding to the first time of photographing to the $N^{th}$ time of photographing performed by the user, and calculate an average value of the N delay times to obtain an average delay time corresponding to the $N^{th}$ time of photographing, wherein N is an integer greater than 1; and when a difference between the average delay time corresponding to the $N^{th}$ time of photographing and an average delay time corresponding to the $(N-1)^{th}$ time of photographing is within a preset range, update, to the average delay time corresponding to the $N^{th}$ time of photographing, the standard delay time caused by the operation of the user on the photographing device.

12. The photographing device according to claim 11, wherein the processor is configured to perform obtaining an average value of at least two delay times to generate a standard delay time caused by an operation of the user on the photographing device, by implementing the following:

obtaining N delay times corresponding to the first time of photographing to the $N^{th}$ time of photographing performed by the user, and calculating an average value of the N delay times to obtain an average delay time corresponding to the $N^{th}$ time of photographing, wherein N is an integer greater than 1;

calculating a difference moment between an initiation moment corresponding to the $(N+1)^{th}$ time of photographing and the average delay time corresponding to the $N^{th}$ time of photographing; and if an imaged photo corresponding to the difference moment is a target imaged photo of the $(N+1)^{th}$ time of photographing, updating, to the average delay time corresponding to the $N^{th}$ time of photographing, the standard delay time caused by the operation of the user on the photographing device.

13. The photographing device according to claim 11, wherein the processor is configured to perform obtaining an average value of at least two delay times to generate a standard delay time caused by an operation of the user on the photographing device, by implementing the following:

obtaining a delay time of a preset quantity of times of photographing, and calculating an average value of the delay time of the preset quantity of times of photographing, to obtain the standard delay time caused by the operation of the user on the photographing device.

14. The photographing device according to claim 11, wherein the processor is configured to perform displaying the imaged photo, by implementing the following:

determining, according to the initiation moment of this time of photographing and a preset time interval, a photo display time period corresponding to this time of photographing; and displaying an imaged photo whose imaging moment is within the photo display time period.

15. The photographing device according to claim 11, wherein the processor is configured to perform displaying the imaged photo, by implementing the following:

displaying multiple imaged photos by overlapping them according to different transparencies.

* * * * *